United States Patent [19]

Lawford et al.

[11] 3,745,001
[45] July 10, 1973

[54] LIQUID LEVEL INDICATOR

[75] Inventors: Victor Nicholas Lawford, Pasadena; Richard Paul Granada, West Covina, both of Calif.

[73] Assignee: International Telephone and Telegraph Corporation, New York, N.Y.

[22] Filed: Nov. 12, 1971

[21] Appl. No.: 198,209

[52] U.S. Cl. .............................. 73/299, 73/432 A
[51] Int. Cl. ........................................ G01f 23/16
[58] Field of Search ............... 73/299, 438, 432 A

[56] References Cited
UNITED STATES PATENTS

| | | | |
|---|---|---|---|
| 3,371,534 | 3/1968 | Akeley | 73/299 |
| 2,791,906 | 5/1957 | Vetter | 73/299 |

*Primary Examiner*—Richard C. Queisser
*Assistant Examiner*—Denis E. Corr
*Attorney*—C. Cornell Remsen, Jr., Thomas E. Kristofferson et al.

[57] ABSTRACT

A liquid level indicator for a steam boiler or the like having a differential pressure unit (DPU) connected from the top and the bottom of the boiler. A static pressure sensor is also connected from the top of the boiler. A pointer is rotatably mounted on a base contiguous to a liquid level scale. The pointer is driven by the output of a series of linkages having inputs from both the DPU and the static pressure sensor. The static pressure sensor is employed to produce a correction because the density of boiling water is different at different temperatures and pressures. Without the correction, the indicator would indicate low at elevated pressure on full tank conditions and would indicate high on empty tank conditions. Both indications are hazardous because turbine damage, tube burn out and explosions are possible. The pointer has a fixed pivot for improved accuracy.

5 Claims, 7 Drawing Figures

Patented July 10, 1973

LIQUID LEVEL INDICATOR

BACKGROUND OF THE INVENTION

This invention relates to liquid level indication apparatus, and more particularly to accurate means for indicating the level of a liquid in a receptacle which is maintained at varying temperatures and pressures.

In the past, steam boilers have required the use of apparatus to indicate the level of water therein. However, the density of water changes with temperature. It is also a function of boiler pressure if the temperature is the boiling point of the water at the particular pressure.

A liquid level indication error has existed in such prior art apparatus because of the said change in water density. For this reason a correction was made as a function of the boiler pressure. However, the indicator pointer, in this case, required the use of a movable pivot with a fixed indicator scale. This therefore introduced other errors.

SUMMARY OF THE INVENTION

In accordance with the device of the present invention the above-described and other disadvantages of the prior art are overcome by providing a fixed indicator pointer pivot with a fixed scale in which the pointer is driven both by the difference between the pressures at the top and bottom of the tank, and also by the pressure at the top of the tank.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Figure 1:
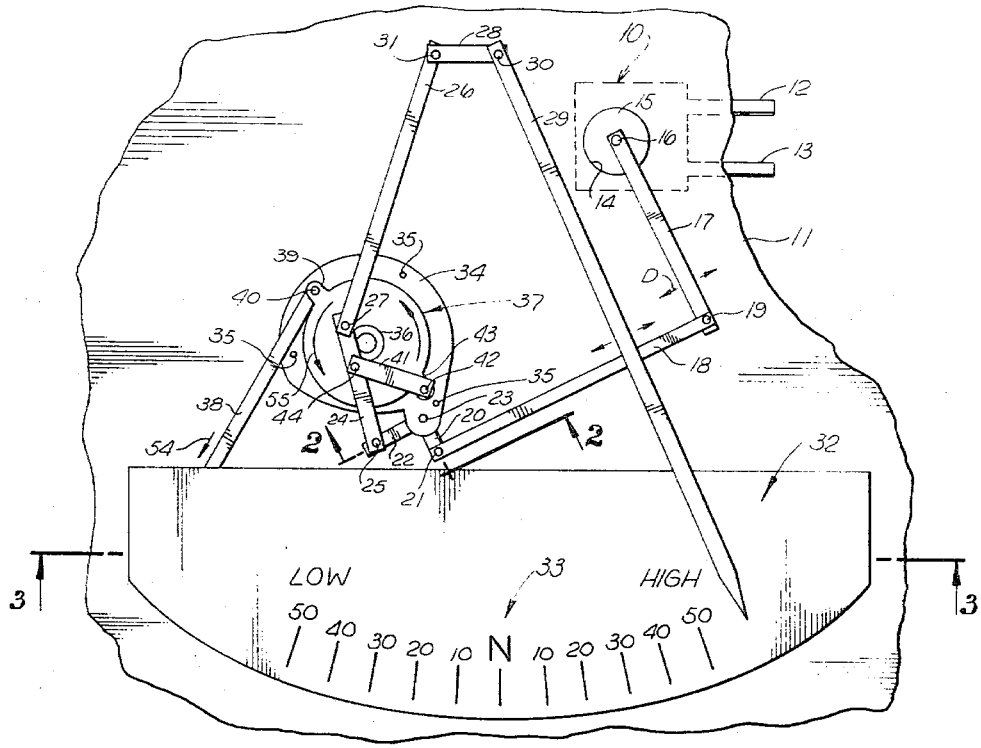
FIG. 1 is a front elevational view of one embodiment of the present invention.

In FIG. 1, a differential pressure unit 10 is mounted in a fixed position relative to a base plate 11. Unit 10 has one inlet 12 for connection to the top of a boiler. Unit 10 also has an inlet 13 for connection to the bottom of the boiler. Plate 11 has a hole 14 therethrough through which a boss 15 of unit 10 projects.

Unit 10 has an output shaft 16 rotatable relative to boss 15. Shaft 16 rotates through an angle which is directly proportional to the difference between the pressures in inlets 12 and 13.

Unit 10 may be entirely conventional. That is, all of its components parts may be conventional, if desired. This includes but is not limited to inlets 12 and 13, boss 15 and shaft 16.

An arm 17 is fixed to shaft 16. A linkage 18 is pinned to shaft 17 at 19. Linkage 18 is also pinned to an arm 20 at 21. Arm 20 is fixed relative to an arm 22. Both arms 20 and 22 are fixed relative to a shaft 23. A linkage 24 is pinned to arm 22 at 25. A linkage 26 is pinned to linkage 24 at 27. An arm 28 is fixed relative to a pointer 29. Both arm 28 and pointer 29 are fixed relative to a shaft 30 which is not movable axially or in a direction perpendicular to its axis, but is rotatable with arm 28 and pointer 29. Shaft 30 is rotatably mounted on plate 11.

Linkage 26 is pinned to arm 28 at 31. Pointer 29 moves over a scale support 32 which carries a scale 33 calibrated, for example, in inches of water.

In general, the scale 33 of this type of instrument shows whether or not the boiler contains a water level above or below a predetermined desired water level. Thus, when pointer 29 is vertical at the center of scale 33, the boiler has been filled to the said predetermined level. When the pointer 29 moves to the left of center, the boiler water level is low. When the pointer 29 moves to the right of center, the boiler water level is high.

A plate 34 is fixed relative to plate 11 in a position spaced therefrom by three pins 35. Pins 35 are fixed both to plate 11 and to plate 34.

Plate 34 has a short shaft 36 fixed thereto. A disc 37 is rotatable on a plate 34 about a shaft 36. Disc 37 is rotatable by movement of a linkage 38. Linkage 38 is moved more or less vertically up and down by a mechanism to be described. The upper end of linkage 38 is pinned to an ear 39 of disc 37 at 40.

A linkage 41 is pinned at 42 to an ear 43 of disc 37. Linkage 41 is also pinned at 44 to linkage 24.

Figure 2:
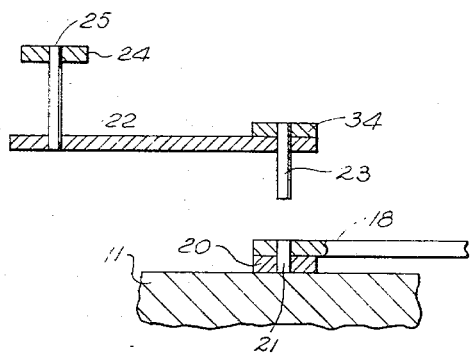
FIG. 2 is a sectional view of a portion of the apparatus taken on the line 2—2 shown in FIG. 1.

The spacings of some of the parts relative to plate 11 are shown in FIG. 2.

Figure 3:
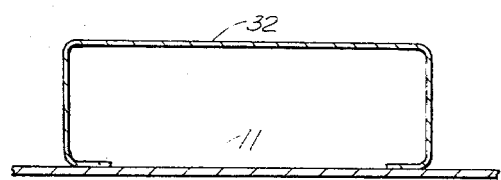
FIG. 3 is a sectional view of a scale support taken on the line 3—3 shown in FIG. 1.

Scale support 32 is fixed relative to plate 11 as shown in FIG. 3.

Figure 4:
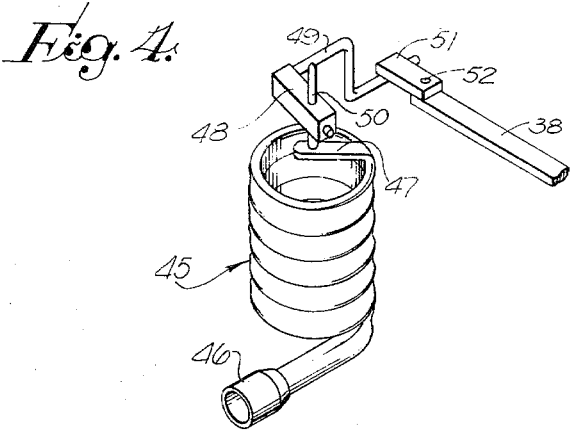
FIG. 4 is a perspective view of a static pressure sensor which is hidden by the scale support in FIG. 1.

As shown in FIG. 4, a helical Bourdon 45 has its lower end fixed relative to plate 11 and is provided with a pressure inlet 46 for connection to the top of the boiler. Bourdon tube 45 may be entirely conventional. At its upper free end, an arm 47 is fixed thereto. Another arm 48 is fixed to a Z-shape rod 49 and to a pin 50 which is also fixed to the arm 47. A member 51 is also fixed to rod 49. The lower end of linkage 38 as viewed in FIG. 1 is pinned at 52 to member 51.

Figure 5:
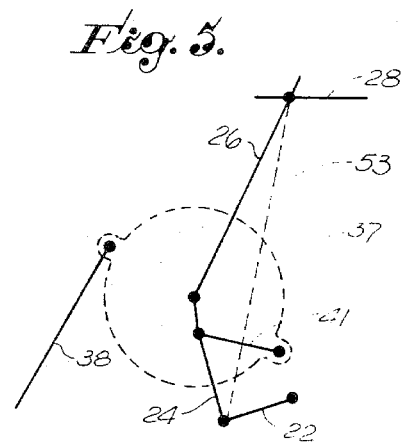
FIG. 5 is a line diagram of the linkages in the indicator movement.

In FIG. 5, for clarity, a few of the linkages have been illustrated as single lines. In effect, the linkages 24 and 26 form a single variable linkage indicated by the dotted line at 53. The length of the dotted line 53 is thus dependent upon the angular position of disc 37.

OPERATION

From FIG. 1, 4 and 5, it will be appreciated that movement of shaft 16 to the right will cause rotation of pointer 29 to the right. If the water level remains constant, this will indicate a decline in differential pressure and, most probably, a decline in static pressure. A decline in static pressure will cause movement of linkage 38 in a direction of arrow 54 in FIG. 1. This will cause disc 37 to turn in the direction of arrow 55. As a result, the linkage indicated by dotted line 53 in FIG. 5 will shorten, and the movement of linkage 38 in direction 54 will cause pointer 29 to move to the right, upscale. In other words, where the water level is constant, and a change in differential pressure causes the instrument to read to low, the Bourdon tube 45 adds a correction to life point 29 to a higher reading. Conversely, when the water level remains constant, and the differential pressure increases, the output to Bourdon tube 45 tends to hold pointer 29 at a constant reading.

When water is heated to boiling in a boiler, its density changes as follows:

| Pressure PSIA | Temperature °F. | Water Lbs./Cu.Ft. | Steam lbs./cu.ft. |
|---|---|---|---|
| Reference | 60.0 | 62.4 | |
| 14.7 | 212 | 59.8 | 0.04 |
| 100.0 | 328 | 52.9 | 0.23 |
| 600.0 | 486 | 49.8 | 1.30 |
| 1000.0 | 545 | 46.1 | 2.22 |
| 1500.0 | 596 | 42.6 | 3.62 |
| 2000.0 | 635 | 39.0 | 5.32 |
| 2500.0 | 667 | 34.7 | 7.68 |
| 3206.0 | 705 | 20.0 | 20.00 |

Figure 6:
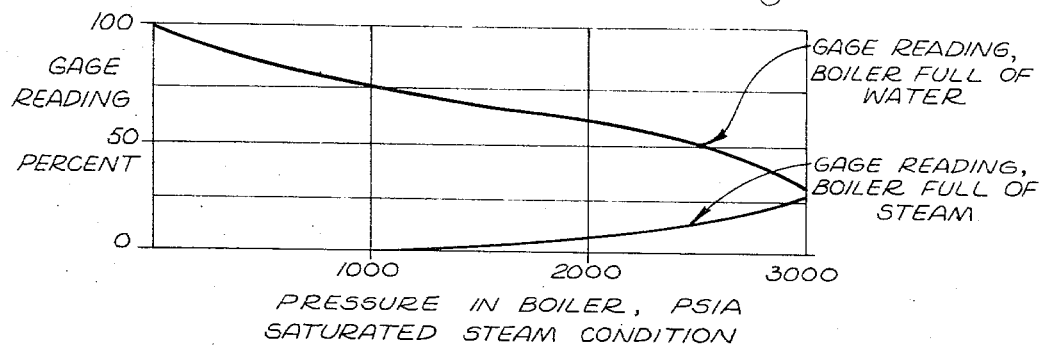
FIG. 6 is a graph indicating the change in density of water and steam with temperature and pressure.

In accordance with the foregoing, the changing densities would normally result in a liquid level gage, hydrstatic type, reading low at high water levels and indicating high when the boiler is empty or near empty of water. This is illustrated in FIG. 6. Note that not only does water decrease in density, but steam also increases in density.

Figure 7:
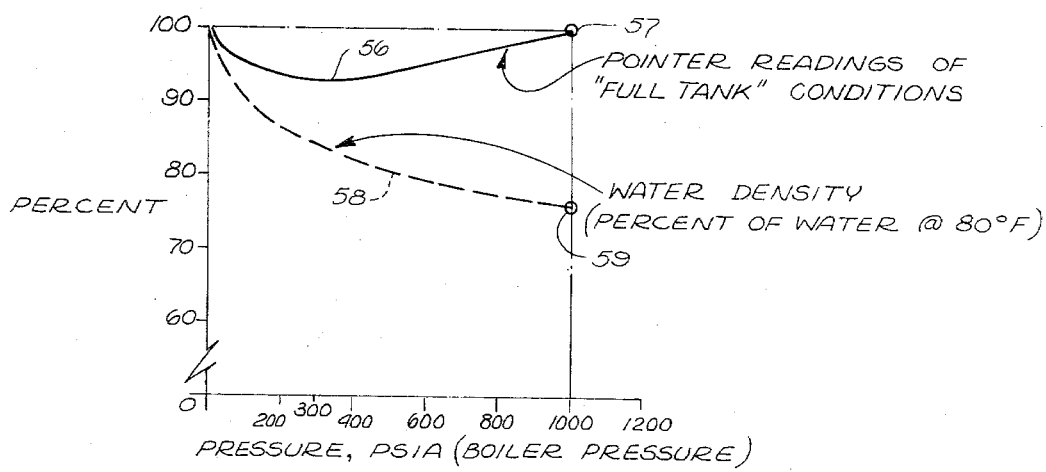
FIG. 7 is a graph indicating the change in density of water with the performance of the liquid level indicator of the present invention.

The device of the present invention overcomes this problem as indicated in FIG. 7. Curve 56 is the characteristic curve of the invention when it is calibrated to produce zero output error at point 57 where the tank is filled to the said predetermined leve, i.e., "full tank conditions," and is maintained at a pressure of 1,000 PSIA. Curve 56 does have a finite error between 0 and 1,000 PSIA, but that error is quite small in the vicinity of point 57.

In FIG. 7, water density is indicated by a dotted curve 58 which begins at a point of 100 percent and zero pressure, and terminates at a point 59 of 74.4 percent at 1,000 PSIA.

What is claimed is:

1. In a system wherein a liquid partially fills a tank and the tank has an internal pressure in excess of one atmosphere, the liquid having a density which decreases with the internal pressure and temperature, apparatus for producing a mechanical movement proportional to the liquid level in the tank, said apparatus comprising: a base; a differential pressure unit having one inlet responsive to the pressure above the liquid level and another inlet responsive to the pressure at the bottom of the tank, said unit having an output shaft rotatably mounted on said base, said output shaft having a position which is proportional to the difference between the pressures in said inlets; an output member whose position is proportional to the level of the liquid; a terminal shaft mounted on said base pivotally supporting said output member, said terminal shaft being mounted so as not to move in a direction perpendicular to its axis; a pressure sensor mounted on said base, said sensor having one end movable in response to said one inlet pressure; a first linkage fixed relative to and pivoted about the same axis as that of said output member; and means connected from said unit output shaft and from the said one end of said sensor to said first linkage to move said first linkage and said output member in accordance with the level of the liquid, said unit causing said means to move said output member in a predetermined direction when the inlet pressure differential increases and said one inlet pressure remains constant, said sensor causing said means to move said output member in a direction opposite to said predetermined direction when said one inlet pressure increases and said differential pressure remains constant.

2. The invention as defined in claim 1, wherein said means is constructed to cause said output member to indicate the accurate level of the liquid with zero error at a predetermined pressure in said one inlet substantially larger than one atmosphere and at a temperature which is the boiling point of the liquid at said predetermined pressure.

3. The invention as defined in claim 2, wherein a scale calibrated in liquid level is fixed relative to said base in a position contiguous to said output member.

4. The invention as defined in claim 3, wherein said means includes a second linkage fixed relative to and pivoted with said unit output shaft, a first auxiliary shaft mounted on said base, third and fourth linkages fixed relative to each other and pivoted on said first auxiliary shaft, a fifth linkage having one end pivoted on said second linkage in a position spaced from the axis of said unit output shaft, said fifth linkage having its other end pivoted on the end of said third linkage in a position spaced from the axis of said first auxiliary shaft, sixth and seventh linkages, said sixth linkage having one end pivoted to said fourth linkage in a position spaced from the axis of said first auxiliary shaft, said sixth linkage having its other end pivoted to one end of said seventh linkage, an eighth linkage fixed relative to said output member, the other end of said seventh linkage being pivoted on said eighth linkage, a second auxiliary shaft mounted on said base, a disc rotatable on said second auxiliary shaft, a ninth linkage having one end pivoted on said sixth linkage between the pivot points of said fourth and seventh linkages thereon, said ninth linkage being pivoted on said disc at a point spaced from the axis of said second auxiliary shaft, rigid bracket means fixed to said one sensor end, a tenth linkage having one end pivoted on said bracket means and its other end pivoted on said disc in a position spaced from the axis of said second auxiliary shaft.

5. The invention as defined in claim 1, wherein a scale calibrated in liquid level is fixed relative to said base in a position contiguous to said output member.

* * * * *